H. C. WRIGHT & J. E. ANDREW.
MACHINE FOR CUTTING AND GRINDING HELICAL COMPRESSION SPRINGS.
APPLICATION FILED NOV. 2, 1914.
1,166,875.
Patented Jan. 4, 1916.
6 SHEETS—SHEET 1.
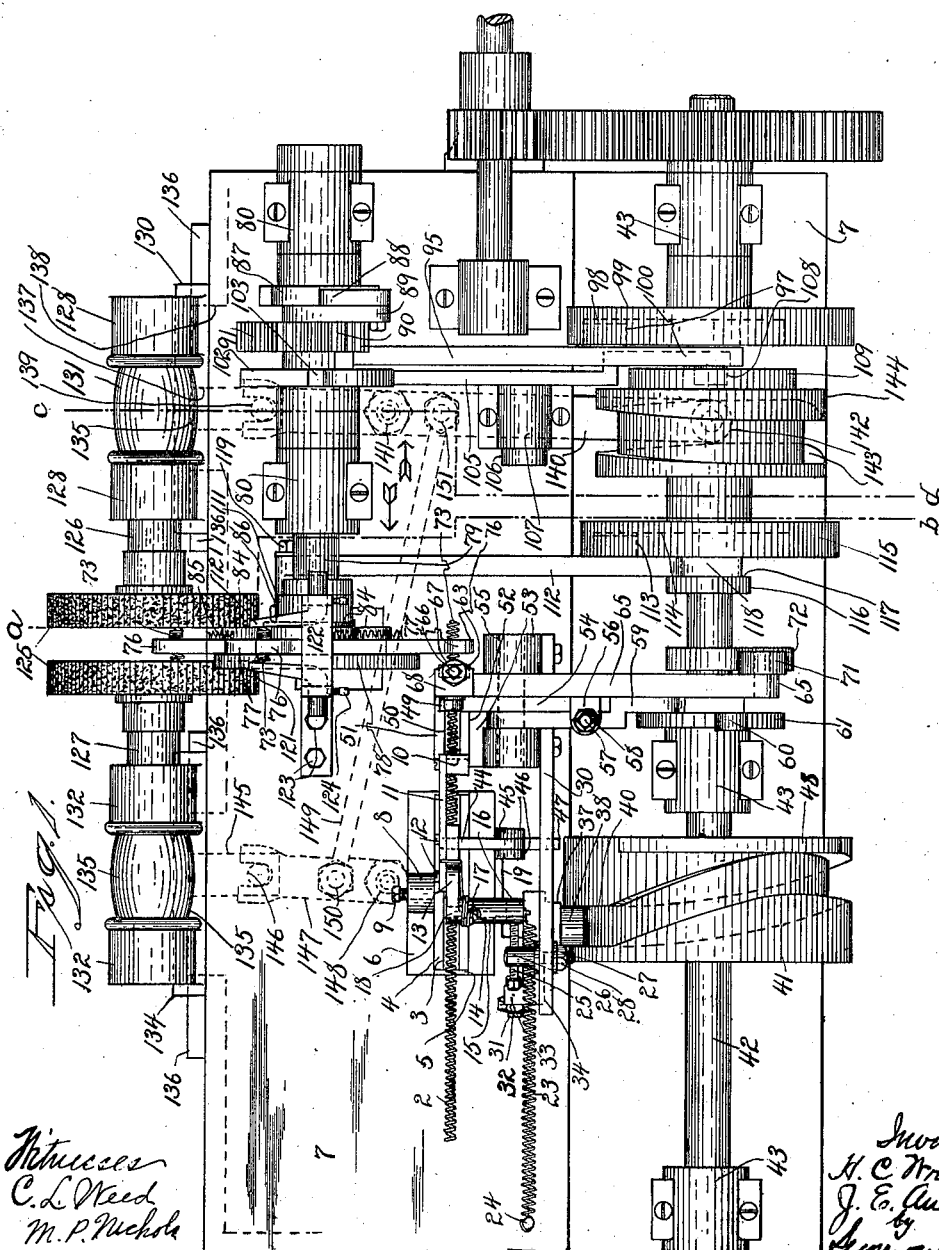

H. C. WRIGHT & J. E. ANDREW.
MACHINE FOR CUTTING AND GRINDING HELICAL COMPRESSION SPRINGS.
APPLICATION FILED NOV. 2, 1914.
1,166,875.
Patented Jan. 4, 1916.
6 SHEETS—SHEET 2.
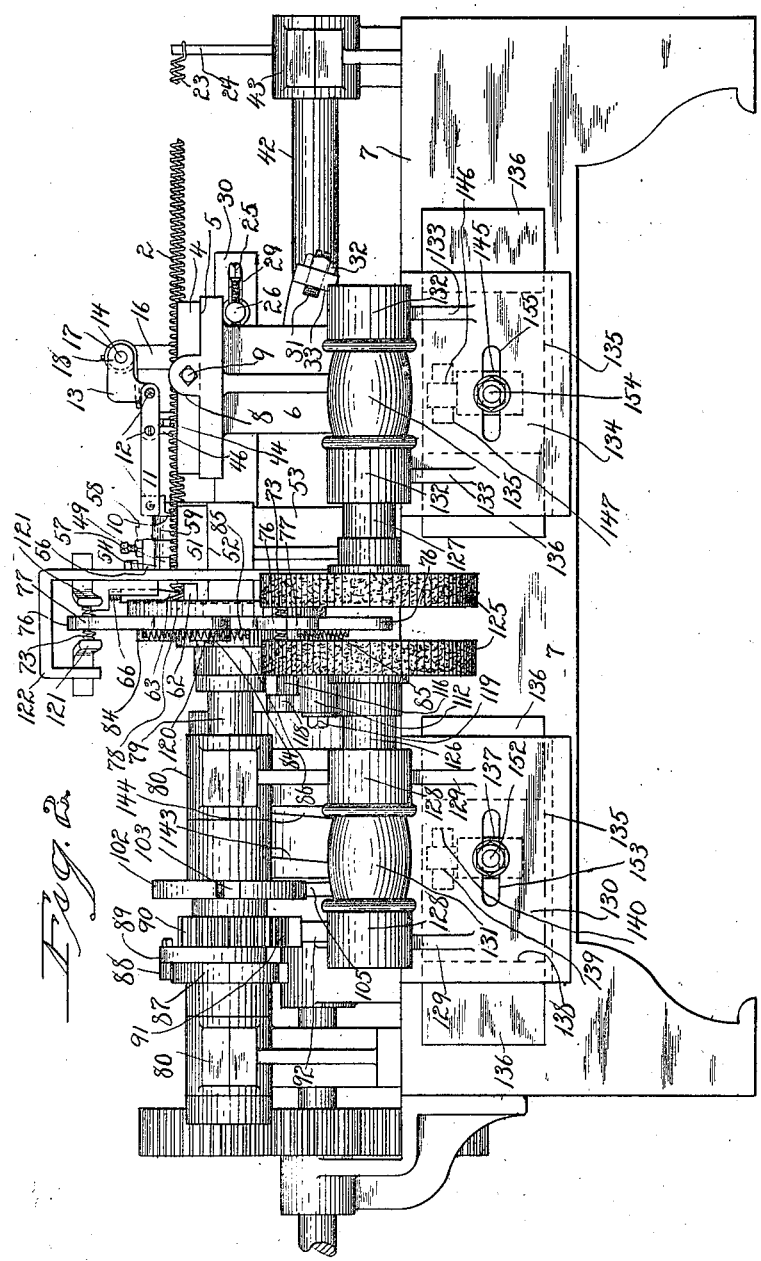

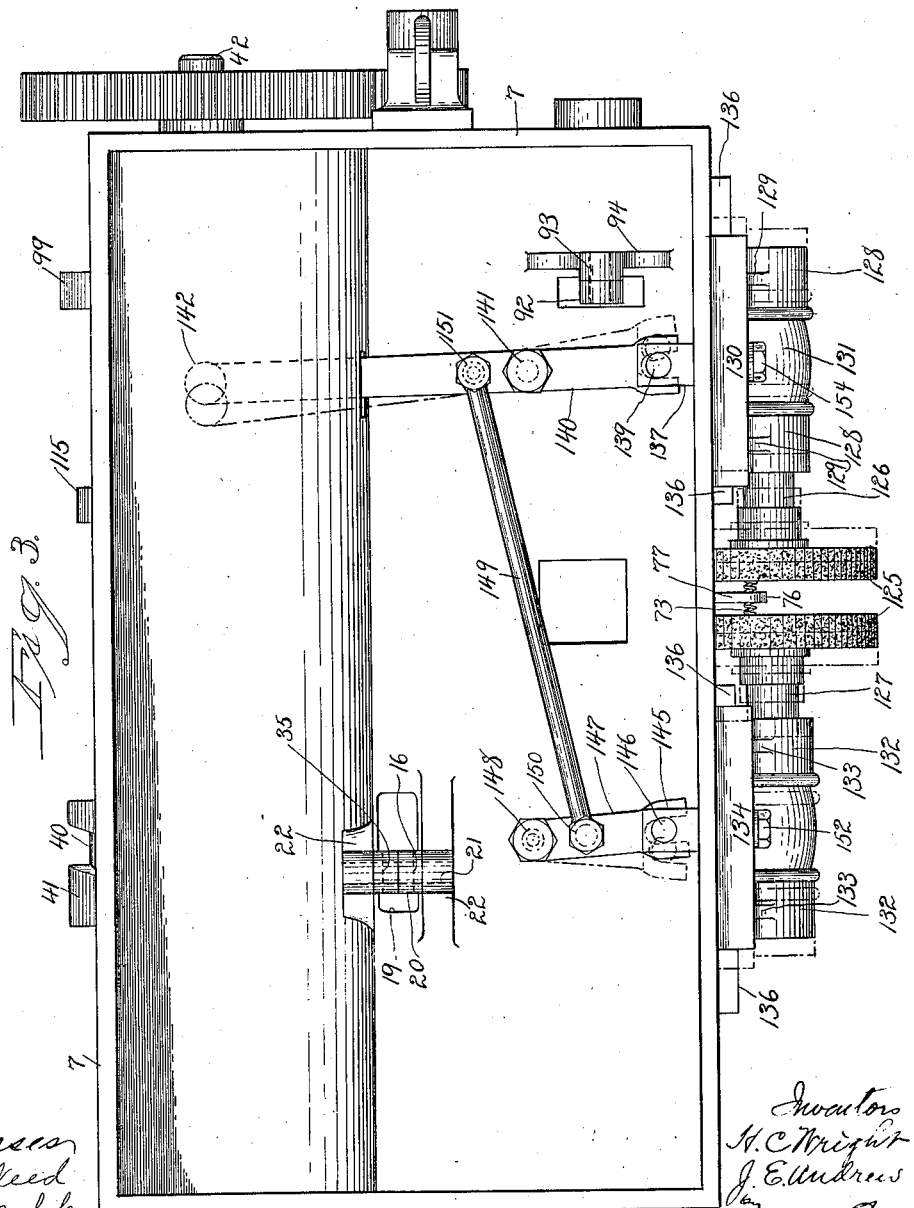

H. C. WRIGHT & J. E. ANDREW.
MACHINE FOR CUTTING AND GRINDING HELICAL COMPRESSION SPRINGS.
APPLICATION FILED NOV. 2, 1914.
1,166,875.
Patented Jan. 4, 1916.
6 SHEETS—SHEET 4.
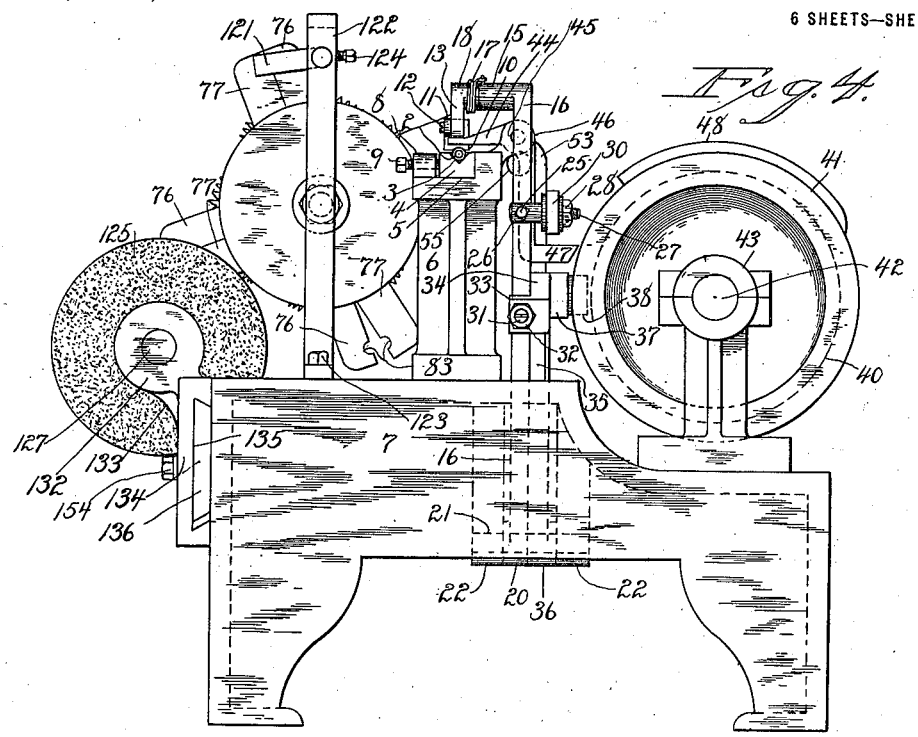
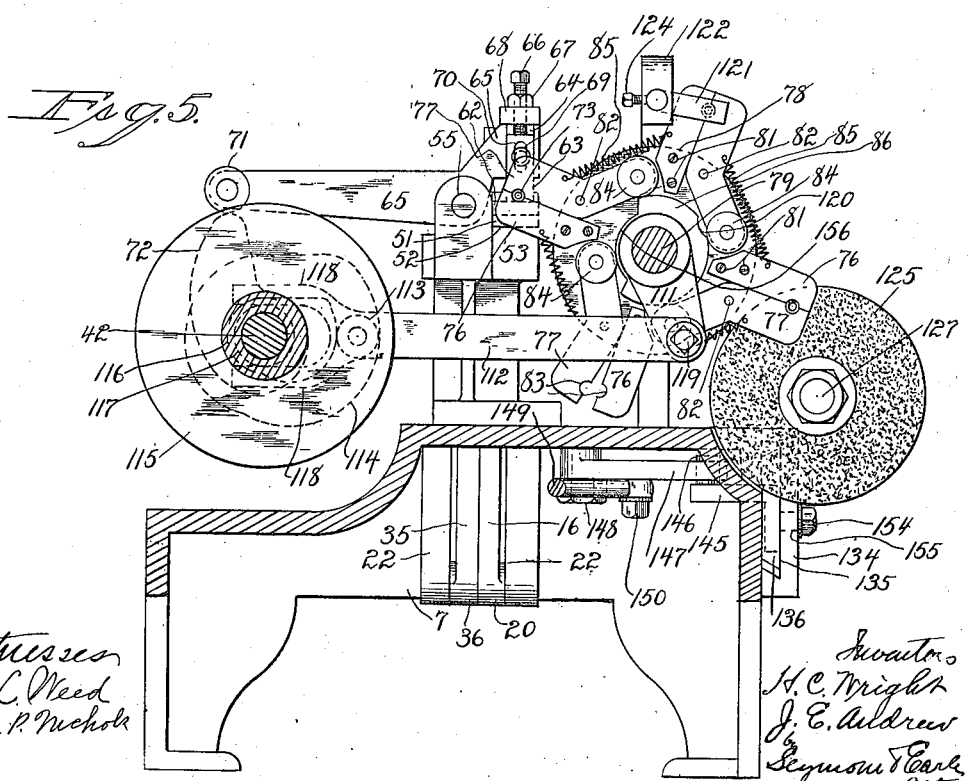

H. C. WRIGHT & J. E. ANDREW.
MACHINE FOR CUTTING AND GRINDING HELICAL COMPRESSION SPRINGS.
APPLICATION FILED NOV. 2, 1914.
1,166,875.
Patented Jan. 4, 1916.
6 SHEETS—SHEET 5.
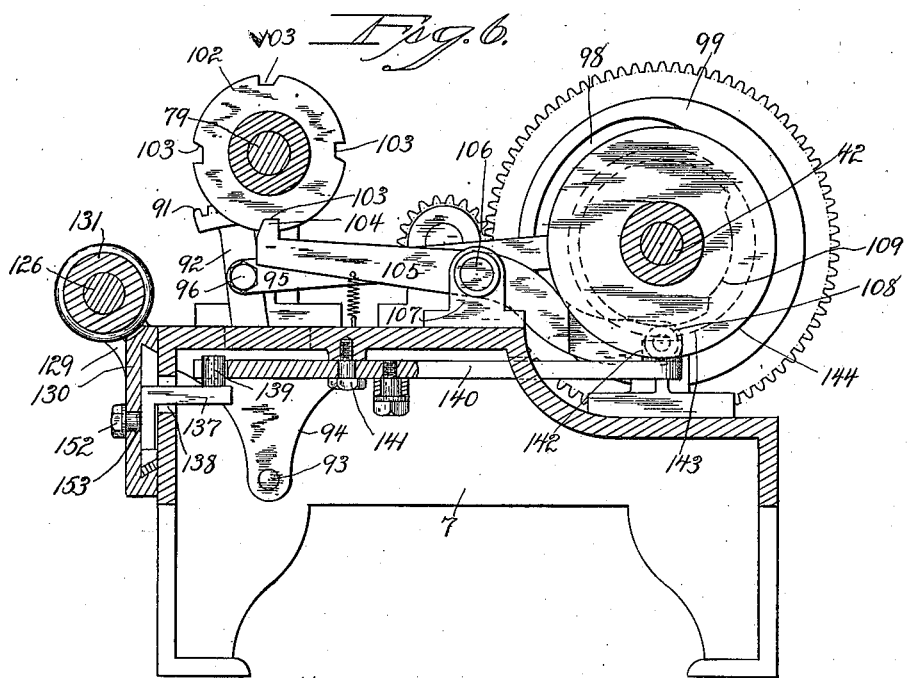
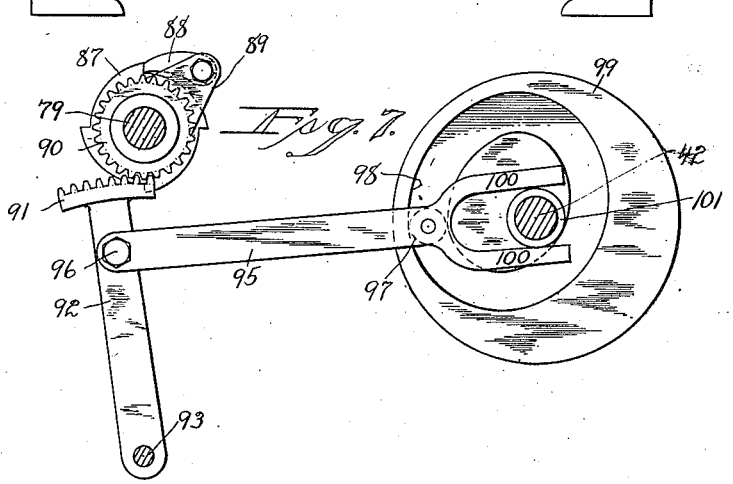
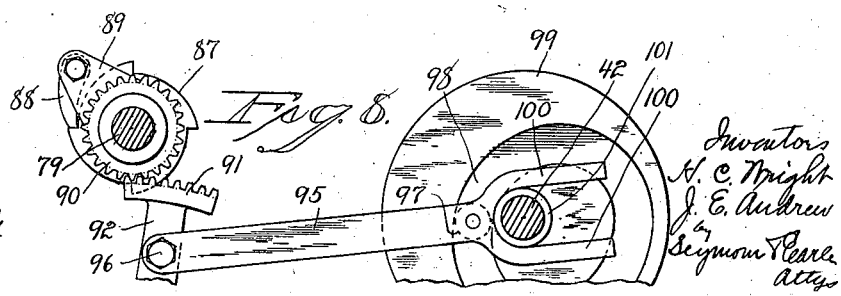

H. C. WRIGHT & J. E. ANDREW.
MACHINE FOR CUTTING AND GRINDING HELICAL COMPRESSION SPRINGS.
APPLICATION FILED NOV. 2, 1914.
1,166,875.
Patented Jan. 4, 1916.
6 SHEETS—SHEET 6.
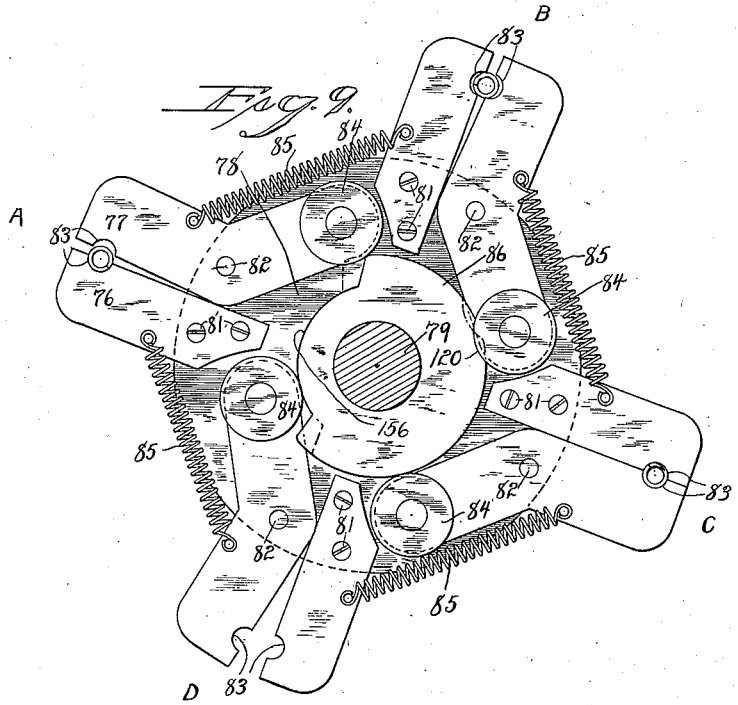
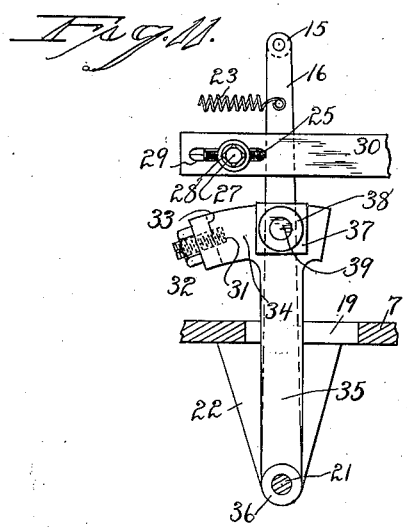
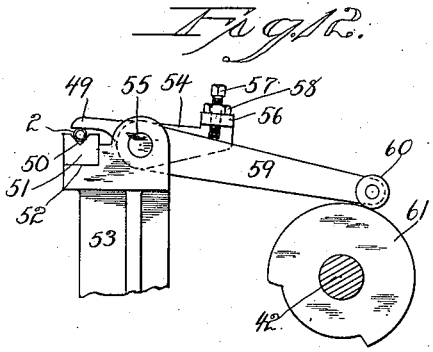
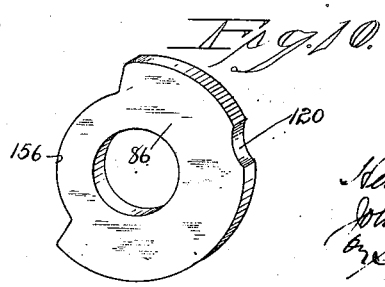

UNITED STATES PATENT OFFICE.

HENRY C. WRIGHT AND JOHN ERNEST ANDREW, OF BRISTOL, CONNECTICUT, ASSIGNORS TO THE WALLACE BARNES CO., OF BRISTOL, CONNECTICUT, A CORPORATION.

MACHINE FOR CUTTING AND GRINDING HELICAL COMPRESSION-SPRINGS.

1,166,875. Specification of Letters Patent. Patented Jan. 4, 1916.

Application filed November 2, 1914. Serial No. 869,886.

*To all whom it may concern:*

Be it known that we, HENRY C. WRIGHT and JOHN ERNEST ANDREW, citizens of the United States, residing at Bristol, in the county of Hartford and State of Connecticut, have invented a new and useful Improvement in Machines for Cutting and Grinding Helical Compression - Springs; and we do hereby declare the following, when taken in connection with the accompanying drawings and the characters of reference marked thereon, to be a full, clear, and exact description of the same, and which said drawings constitute part of this application and represent, in—

Figure 1 a plan view of a machine for cutting and grinding helical compression springs, constructed in accordance with our invention. Fig. 2 a view thereof in left hand side elevation. Fig. 3 an underside view of the machine. Fig. 4 a view of the machine in front elevation regarding the front of the machine as the end thereof into which the stock is fed. Fig. 5 a view of the machine in vertical transverse section on the line $a$—$b$ of Fig. 1. Fig. 6 a corresponding view of the machine on the line $c$—$d$ of Fig. 1. Fig. 7 a detail view showing the means employed for the step-by-step rotation of the gripper shaft, the parts being shown in readiness to give the gripper-shaft a quarter turn. Fig. 8 a corresponding view showing the same parts at the completion of a quarter turn of the shaft. Fig. 9 a detached view in elevation showing the four pairs of gripper-jaws mounted upon the gripper-jaw disk. Fig. 10 a detached perspective view of the oscillating gripper-jaw cam. Fig. 11 a detail view in right hand side elevation of the oscillating lever employed for feeding the continuous spring stock. Fig. 12 a detail view in front elevation showing the means employed for holding the spring stock against endwise displacement. Fig. 13 a detached plan view of a short length of the spring as cut off from the spring stock. Fig. 14 a view of the same spring after its end coils have been ground to form a compression spring. Fig. 15 a view of the ground spring in end elevation, on an enlarged scale.

Heretofore in making helical compression springs from long lengths of spring stock, the stock has been cut up in one machine and the sections manually ground, one end at a time, on a wheel. This method of production is slow and expensive, and the product lacks uniformity.

The object of our invention is to combine the cutting and grinding operations in one automatic machine in which the end coils of the springs are ground simultaneously and with superior accuracy at a reduced cost for labor and in a shorter time than when the same work is done by hand.

With these ends in view, our invention consists in an automatic machine for cutting and grinding helical compression springs, the said machine having certain details of construction and combinations of parts as will be hereinafter described and pointed out in the claims.

In carrying out our invention as herein shown, one end of a long length of helical spring-stock 2 is fed into a V-shaped groove 3 in a guide-block 4 set into a recess 5 in a bracket 6 bolted to the machine-frame 7 and provided with a lug 8 furnished with a set-screw 9 for clamping the block 4 in place.

The spring-stock 2 is drawn into the machine by a step-by-step movement over the guide-block 4, by means of a knife-like narrow feeding-finger 10 adapted to readily enter itself between the coils of the spring-stock which runs at a right angle to the plane of the said knife-like finger which is mounted in the end of a horizontal plate 11 fastened by screws 12 to the horizontal arm of a small head 13 having a slight rocking movement upon a stud 14 passing through a hub 15 integral with the upper end of an oscillating feeding-lever 16 swinging in the vertical plane. A spring 17 fastened to the hub 15 and encircling the hub 18 of the head 13 exerts a constant effort to crowd the finger 10 between the coils of the spring-stock. The finger 10, plate 11 and hub 13 virtually form a pawl swinging upon the stud 14 as a center.

The oscillating feeding-lever 16 passes downward through an opening 19 in the machine-frame 7, and is furnished at its extreme lower end with a hub 20 receiving a fixed stud 21 having its opposite ends fixed in bracket-arms 22 depending from the machine-frame. The lever 16 is retracted or drawn forward for moving the finger 10 into position to take a new hold upon the spring-stock 2, by means of a helical spring 23 (Figs. 1 and 11) fastened to the lever and to an upstanding rod 24 in the machine-frame. The said spring 23 brings the lever 16 to a stop against an adjusting-screw 25 carried by an adjustable stud 26 having a threaded stem 27 carrying a nut 28 and passing through a slot 29 in a plate or bar 30 forming a feature of the machine-frame. The said lever 16 is swung inward to effect the feeding of the spring-stock 2, by the engagement of its outer edge by a screw 31 carrying a check-nut 32 and mounted in a lug 33 formed upon the outer end of a segmental arm 34 at the upper end of a rock-arm 35 the lower end of which has a hub 36 receiving the stud 21 aforesaid. The segmental arm 34 is formed upon its right hand face with a square boss 37 forming a bearing for an anti-friction roller 38 turning upon a pin 39, and traveling in a cam-path 40 in a stock-feeding cam 41 mounted upon the main shaft 42 which is journaled in three boxes 43 fastened to the machine-frame 7.

The length of the sections or short springs into which the spring-stock 2 is cut, is regulated both by the screw 25 the adjustment of which determines the forward movement of the lever 16, and by the screw 31 the adjustment of which regulates the distance which the rock-arm 35 must travel before it picks up the said lever 16 by which the stock is fed, step-by-step, into the machine.

For positively disengaging the feeding-finger 10 from between the coils of the spring-stock, we employ a lifting-lever 44 (Fig. 4) the upper end of which extends directly under the plate 11 carrying the finger 10. The said lever 44 which is S-shaped in general form, is hung upon a stud 45 between two lugs 46 upstanding from the bracket 6. The lower end 47 of the lever 44 is beveled to coact with a releasing-cam 48 applied to the periphery of the stock-feeding cam 41 and operating through the said lever 44 to lift the feeding-finger 10 and clear the same from the stock 2 before the lever 16 begins to rock forward to position the finger 10 to take a new "hitch" upon the stock.

To prevent the stock from longitudinal displacement at any time except at the moment of being fed, and also from being lifted out of place when the feeding-finger 10 is being disengaged from it, we provide a pinching-finger 49 (Fig. 12) extending over a V-shaped groove 50 in a secondary guide-block 51 set into a recess 52 in the upper end of a bracket 53 fastened to the machine-frame 7. The finger 49 is formed upon a rock-arm 54 mounted upon a stud 55 in the bracket 53. At its rear end the arm 44 has a lug 56 carrying an adjusting-screw 57 furnished with a check-nut 58 and engaging with the upper edge of a lifting-arm 59 also hung upon the stud 55 aforesaid, and carrying an antifriction roller 60 riding upon the stock-pinching cam 61, on the main shaft 42.

To provide for cutting the spring-stock 2 into short lengths, the rear end of the guide-block 51 is recessed for the reception of an anvil 62 (Fig. 2) coacting with a knife 63 located in a vertical recess 64 (Fig. 5) in a knife-carrier 65 rocking upon the stud 55. A set-screw 66 furnished with a check-nut 67 and mounted in a lug 68 at the upper end of the part 65 provides for adjusting the knife 63 which is guided in being adjusted by a pin 69 passing through a slot 70 in the knife itself. The knife-carrier 65 is furnished with an antifriction roller 71 coacting with a snail-like knife-cam 72 on the main-shaft 42.

The knife 63 cuts the spring-stock 2 up into short springs 73 having outwardly inclined end-coils 74, as shown by Fig. 13. To grind down the said end-coils 74 to furnish the springs with flat-bearing ends 75 as shown in Figs. 14 and 15, may be said to be the main function of our improved machine, although, if desired, its grinding mechanism may be cut out of operation, and the machine used simply for cutting up spring-stock.

For grinding the springs 73, we provide the machine with four duplicate pairs of gripper-jaws (Fig. 9), each pair comprising a straight fixed jaw 76 and a bent pivotal jaw 77. These pairs of jaws are arranged at equal distances apart or quartering upon a jaw-carrying disk 78 fastened to a gripper-shaft 79 journaled in boxes 80, (Figs. 1 and 2). The respective jaws 76 are secured by screws 81 to the said disk while the jaws 77 are pivotally mounted upon pins 82 carried thereby. At their outer ends the fixed and pivotal jaws of each pair are furnished with semi-circular notches 83 for the reception of the fed end of the stock, and the carriage of the said end when it has been cut off and forms one of the short springs 73. Interchangeable sets of these gripper-jaws will be applied to the disk 78 according as it is desired to use the machine in cutting up and grinding different diameroller 84 of the pivotal jaw 77 of the same pair of jaws is caused to ride out of the notch 120 with the effect of swinging the jaw so as to grip the now centered spring. The shaft 79 is then unlocked and moved another quarter turn, whereby the same jaws are brought into the "C" or grinding position. During this last quarter turn of the shaft 79, the cam 86 will have been restored to its normal position but without unlocking the pair of jaws in question, since the roller 84 of their pivotal jaw will now have been carried beyond the notch 120 in the cam.

The grinding of the end-coils of the spring 73 now centered and gripped, is effected by means of two grinding-wheels 125 respectively mounted upon the inner ends of alined longitudinally movable shafts 126 and 127. The said shaft 126 is mounted in two bearings 128 supported by webs 129, 129, cast upon the upper corners of a horizontal slide 130. Between the bearings 128 the shaft 126 is furnished with a pulley 131. The shaft 127 carrying the grinding wheel 125, is journaled in bearings 132, 132, located at the upper ends of webs 133, 133, cast integral with the upper corner of a horizontal slide 134. A pulley 135 placed upon the shaft 127 between the bearings 132, 132, provides for driving the grinding wheel 125. The inner faces of the slides 130 and 134 are formed with dovetail grooves 135 receiving dovetails 136 fastened to the left hand side of the machine-frame 7. As shown in Figs. 3 and 6, the slide 130 is provided with an angular coupler 137 extending inward through an opening 138 in the machine-frame 7 and carrying a pin 139 entering the forked left hand end of a lever 140 swinging upon a stud 141 depending from the bed of the machine-frame 7. The right hand end of the lever 140 is provided with a roller 142 traveling in a cam-path 143 in a grinding-wheel cam 144 on the main-shaft 42. The slide 134 is correspondingly provided with an angular coupler 145 (Figs. 3 and 5) carrying a pin 146 entering the fork at the left hand end of a short lever 147 hung on a stud 148 depending from the bed of the machine-frame 7. The lever 147 is connected with the lever 140 which operates it, by means of a link 149 which is connected with the said lever 147 by a stud 150 located on the left hand side of the stud 148, and connected with the lever 140 by a stud 151 on the right hand side of the stud 141 on which the lever 140 swings.

For adjusting the rear grinding-wheel 125, the slide 130 is connected with the coupler 137 by means of a screw 152, the slide having a slot 153 to permit it to be adjusted with reference to the said screw 152. In the same manner, the slide 134 is adjustably connected with the coupler 145, by means of a screw 154 passing through a horizontal slot 155 in the slide.

The cam 143 is timed so as to separate the wheels 125 prior to the entrance of the spring 73 into position between them, after which, by a quarter turn of the shaft 79, they are advanced for grinding its end-coils 74 to form the flat bearings 75 shown by Figs. 14 and 15. The grinding-wheels are now retired by the cam 143 and the shaft 79 rotated another quarter turn to carry the same into the "D" or delivery position in which the roller 84 of the pivotal jaw drops into the low dwell 156 of the cam 86, permitting the jaws to discharge the ground spring through an opening 157 in the bed of the machine-frame 7.

It will be understood from an examination of Fig. 9 that by employing four pairs of jaws, three separate springs 73 are constantly being operated upon at the same time, one being received and cut off, another being centered, and another being ground. The number of pairs of jaws employed may, of course, be varied in which case the rotary impulse of the gripper-shaft will have to be arranged to correspond to the number of pairs of jaws.

Having already described in considerable detail the operation of the machine, as well as its construction, it will be sufficient to say that the spring-stock 2 after having been started into the machine, is automatically fed forward therein step-by-step, firmly gripped against displacement between its successive step-by-step movements, fed into the jaws of a carrier and gripped, cut off, centered, ground at its ends and discharged from the machine, these operations being continuous as long as spring-stock is supplied.

We claim:

1. In a machine for cutting helical springs from long lengths of spring stock and grinding the end-coils of such springs, the combination with automatic feeding mechanism adapted to enter between the open coils of the spring stock for feeding the same step-by-step for a distance predetermined by the number of coils desired in the finished springs, cutting mechanism for cutting springs containing the predetermined number of coils from the fed-end of the stock during the interval of rest between its step-by-step feeding movement, and grinding mechanism for grinding the end-coils of the springs.

2. In a machine for cutting helical springs from long lengths of spring stock and grinding the end-coils of such springs, the combination with automatic feeding mechanism for feeding the stock step-by-step for a distance predetermined by the number of coils desired in the finished springs, means for gripping the fed-end of the stock after it ters of spring-stock. Each of the bent pivotal jaws 77 is furnished at its inner end with an anti-friction roller 84 all of which are constantly maintained in engagement with the periphery of an oscillating gripper-jaw cam 86 loosely mounted upon the shaft 79, by four springs 85 extended between the adjacent fixed and pivotal jaws.

The jaws of the respective four pairs of jaws are exactly alike as to construction and operation, and function in succession in four different positions, which for convenience, are designated upon Fig. 9 as A, B, C, and D. A designates the stock-receiving position of the jaws; B their spring-centering position, C their grinding position; and D their delivering position.

For causing the respective pairs of jaws to successively take and hold their several designated positions A, B, C and D, the gripper-shaft 29 is intermittently given a quarter impulse, succeeded by a period of rest long enough to permit the four pairs of jaws to function in their respective positions. For this purpose a four-toothed ratchet-wheel 87 (Figs. 7 and 8) fixed upon the said shaft 79, is engaged by a pawl 88 carried by an oscillating-arm 89 rigid with an oscillating pinion 90 loosely mounted on the shaft 79 and engaged by a segmental rack 91 at the upper end of a rock-arm 92 hung at its lower end upon a stud 93 in a bracket 94 depending from the machine-frame 7 and oscillated by a forked link 95 pivotally connected with it near its upper end by a screw stud 96, the forked end of the said link carrying an anti-friction roller 97 entering a cam-path 98 in the gripper-shaft driving cam 99. The yoke-arms 100 of the link 95 embrace the hub 101 of the said cam 99 and maintain the roller 97 on a center line between the stud 96 and the main shaft 42 on which the cam 99 is mounted. Each complete revolution of the cam 99 effects through the mechanism just described, a quarter turn of the shaft 79.

To lock the gripper-shaft 79 so as to rigidly hold the respective pairs of jaws in their functioning positions, we provide the gripper-shaft 79 with a gripper-locking disk 102 (Fig. 8) having four quartering locking-notches 103 receiving in succession the locking-nose 104 of a rocking locking-lever 105 mounted upon a stud 106 in a bracket 107 fastened to the machine-frame 7. At its right hand end the lever 105 carries a roller 108 riding on the periphery of a gripper-shaft locking-cam 109 fastened to the main-shaft 42.

Assuming that the gripper-shaft 79 has just been given a quarter turn and locked in position, as above described, the inner end of the spring-stock 2 is fed into the open pair of jaws now in position "A." At the end of this feeding movement and before a spring 73 is cut off by the knife 63, the jaws are closed upon the fed end of the stock by a counter clockwise movement of the oscillating gripper-jaw cam 86 which is operated by a crank-arm 111 (Fig. 5) connected with a link 112 carrying an antifriction roller 113 traveling in the cam-path 114 of a rotary gripper-jaw cam 115 on the main shaft 42. The said cam 115 is furnished with a hub 116 (Fig. 1) formed with an annular groove 117 for the reception of the arms 118 of a yoke at the upper end of the aforesaid link 112, whereby the roller 113 is maintained on a line between the center of the main shaft 42 and the center of the stud 119 employed to connect the crank-arm 111 with the link 112. The reverse movement of the cam 86 thus provided for, having closed the jaws as shown in Fig. 5 upon the fed end of the stock, the knife 63 is operated to cut off the fed end of the stock, whereby one of the springs 73 is produced. The cam 109 now operates to unlock the gripper shaft 79 and the same is given another quarter turn by the action of the cam 99, whereby the jaw-carrying disk 78 is given a quarter turn, causing the four pairs of jaws to be moved from left to right through an arc of 45°, so that the jaws in "A" position will take "B" position, and so on. During this quarter-turn movement of the said disk 78, the oscillating cam 86 is turned forward by the action of the cam 115, back into its normal position so that its notch 120 will be in readiness to receive the roller 84 of the pivotal jaw 77 of the pair of jaws which have just received the last spring 73 cut off from the stock, when the said disk 78 is brought to rest at the end of its current quarter turn movement. When the pair of jaws in question reach "B" position, they are therefore opened by the entrance of the roller 84 of the pivotal jaw into the notch 120 in the cam 86. The opening of the jaws in "B" position, (Fig. 9) releases the short spring 73 carried by them, and permits it to instantaneously center itself by moving longitudinally in one direction or the other.

For centering the said spring 73, we employ two centering-fingers 121, 121, mounted opposite each other in a frame 122 secured in place by bolts 123. Set screws 124 provide for the adjustment of the fingers 121 which are inclined toward each other and set apart so as to form a vertical passage the center of which will be in line with the center of the vertical space between the grinding wheels 125 when they are at the limit of their excursion toward each other. The centering of the spring takes place just as the jaws open in the "B" or spring-centering position, the spring springing endwise in one direction or the other according to the position of its longitudinal center with respect to the fingers 121, 121. The cam 86 is now oscillated counter-clockwise whereby the has been fed, cutting mechanism for cutting off the fed-end of the stock after it has been so fed and gripped, centering means for positively centering the severed springs after they have been cut off and released by the said gripping means, and grinding means for grinding the end-coils of the springs after they have been centered and re-gripped.

In testimony whereof, we have signed this specification in the presence of two subscribing witnesses.

HENRY C. WRIGHT.
JOHN ERNEST ANDREW.

Witnesses:
HARRY C. BARNES,
MARY REYNOLDS.